INVENTOR.
ROBERT D. CHUTE
BY
AGENT

United States Patent Office 3,510,756
Patented May 5, 1970

3,510,756
SWITCHING MODE VOLTAGE REGULATOR
Robert D. Chute, Southfield, Mich., assignor to Burroughs Corporation, Detroit, Mich., a corporation of Michigan
Filed Sept. 13, 1967, Ser. No. 667,428
Int. Cl. G05f 1/56, 1/58
U.S. Cl. 323—22                                    12 Claims

ABSTRACT OF THE DISCLOSURE

A switching mode voltage regulator in which the switching rate of a power transistor is controlled by the combination of a differential amplifier, a unijunction transistor relaxation oscillator, and a pulse stretcher and shaper, all of which are energized by the regulated output voltage. Isolating components provide drift-free switching frequency control unaffected by changes in temperature or component characteristics. Circuitry for bypassing the pulse stretcher and shaper provides self-starting cyclic operation. To safeguard the regulator circuitry, the differential amplifier is responsive to harmful voltage surges for automatically turning off the relaxation oscillator and thus shutting down the system.

BACKGROUND OF THE INVENTION

This invention relates to a voltage regulated power supply, and more specifically to a switching mode voltage regulator in which an unregulated voltage source is repeatedly interrupted, then filtered and applied to a load.

Two basic types of voltage regulators are well known in the art. One type utilizes a power element connected in series between a load and source of unregulated voltage. The power element is used in a continuous conduction amplifying mode as a variable resistance device, wherein the output voltage to the load is maintained constant by varying the conductors of the power element. The major disadvantage of this type of device is that the power element necessarily dissipates large amounts of power, therefore limiting its use in transistor circuit applications.

A second type of voltage regulator is commonly known as a switching regulator and uses the combination of a switching element and an averaging circuit, both of which are connected in series between a source of unregulated voltage and a load. This type of regulator generally includes a feedback circuit for monitoring the load voltage and controlling the relationship between the fully conducting and fully non-conducting states of the switching element to maintain the load voltage constant. An advantage of this type of regulator is that the switching element consumes relatively little power. Thus, low power transistors may be used in high power voltage regulation applications.

The switching mode regulation of D.C. voltage has been successfully achieved in several way. In one method, the output from an unregulated D.C. voltage source is chopped by a switching element such as a transistor or silicon controlled rectifier. The chopped voltage is applied to an LC filtering circuit having its output connected to a load, and the output voltage is regulated to a value less than the unregulated input voltage by switching the main power element on and off. In one method of operation, "on" time of successive switching cycles may be held fixed, while the "off" time between cycles is varied. Thus, the repetition rate or chopping frequency of the main switching element is controlled so as to keep the output voltage constant. The chopping frequency may be controlled by feedback means including an oscillator and comparing circuitry. The oscillator produces output pulses at a frequency dependent on the difference between the load voltage and a predetermined reference voltage, as determined by the comparing circuitry.

Switching mode voltage regulators of the type hereinabove described are known to achieve very accurate voltage regulation. However, such systems must be carefully designed to overcome certain disadvantages and problems. For example, accurate regulation depends on the proper operation of the frequency controlled oscillator. This circuitry must be thermally stable to avoid undesirable frequency drift. Also, the frequency control circuitry preferably should be adaptable for use with a wide variety of solid state devices, in order to permit component interchangeability.

Another problem is to insure that the regulator will be self starting when a source of unregulated voltage is first applied to its input. In this situation, the aforementioned feedback means comprising the comparing circuitry and the frequency control oscillator circuitry should be immediately operable to begin controlled periodic switching, and thus voltage regulation, without causing the regulator to lock into a non-operative stalled condition. Still another problems to be overcome is the possbility of component burn out or other damage with resulting loss of regulation, when voltage surges or spikes appear at the regulator output. Thus, adequate safeguards must be incorporated into the overall system configuration.

Some of the above discussed disadvantages and problems have been solved in prior art devices only at the expense of considerable circuit complexity. Heretofore, known circuits require numerous active elements such as transistors or other solid state devices, which generally necessitate the use of a plurality of dual-polarity voltage sources for providing various bias conditions and the like. As a result, these circuits are costly to produce. In other prior art regulators, in which attempts at circuit simplification have been made, voltage regulation is generally inaccurate and unreliable.

Objectives and summary of the invention

It is an object of the present invention to provide a simplified switching mode voltage regulator, employing a minimum number of active elements and external power supplies, for accurately regulating D.C. voltage.

It is another object of the invention to provide a switching mode voltage regulator having improved thermal stability and drift-free frequency control.

A further object of the invention is to provide a simplified voltage regulator circuit that operates independently of reasonable variations in component parameters.

A still further object of the invention is to provide a simplified switching mode voltage regulator wherein the switching frequency control circuit is self-starting.

An additional object of the invention is to safeguard a simplified switching mode voltage regulator by automatically stopping its operation when over-voltage conditions such as voltage surges occur at the output.

In accordance with the foregoing objectives, and other desirable purposes, applicant's inventive switching mode voltage regulator in its broadest aspects comprises a power switching and filtering circuit connected between an unregulated D.C. voltage source and a load terminal, and an improved feedback circuit for controlling cyclic operation of the power switching circuit. The feedback circuitry is driven directly by the load terminal voltage and includes means for comparing the load terminal voltage with a reference voltage, relaxation oscillator means responsive to the comparing means output for generating variable frequency control pulses, and means for stretching and shaping the control pulses to a uniform width and applying the control pulses to the power switching circuit.

The comparing means is responsive to load terminal voltages above a predetermined value to shunt the input to the relaxation oscillator means, thus ceasing its operation. Interstage coupling and isolating means at the input and output of the relaxation oscillator means provides stable frequency control and permits the interchangeability of active elements without adverse effects. Means for by passing the pulse stretching and shaping means is provided to automatically start cyclic operation of the regular when an unregulated D.C. voltage is applied to the input. The overall simplified circuit of the invention provides accurate voltage regulation with only a few active elements and with the optimum use of passive components.

Other objects and features of the invention will be specifically pointed out or will become more apparent when referring to the following description taken in conjunction with the accompanying drawing.

Description of the preferred embodiment

Figure 1:
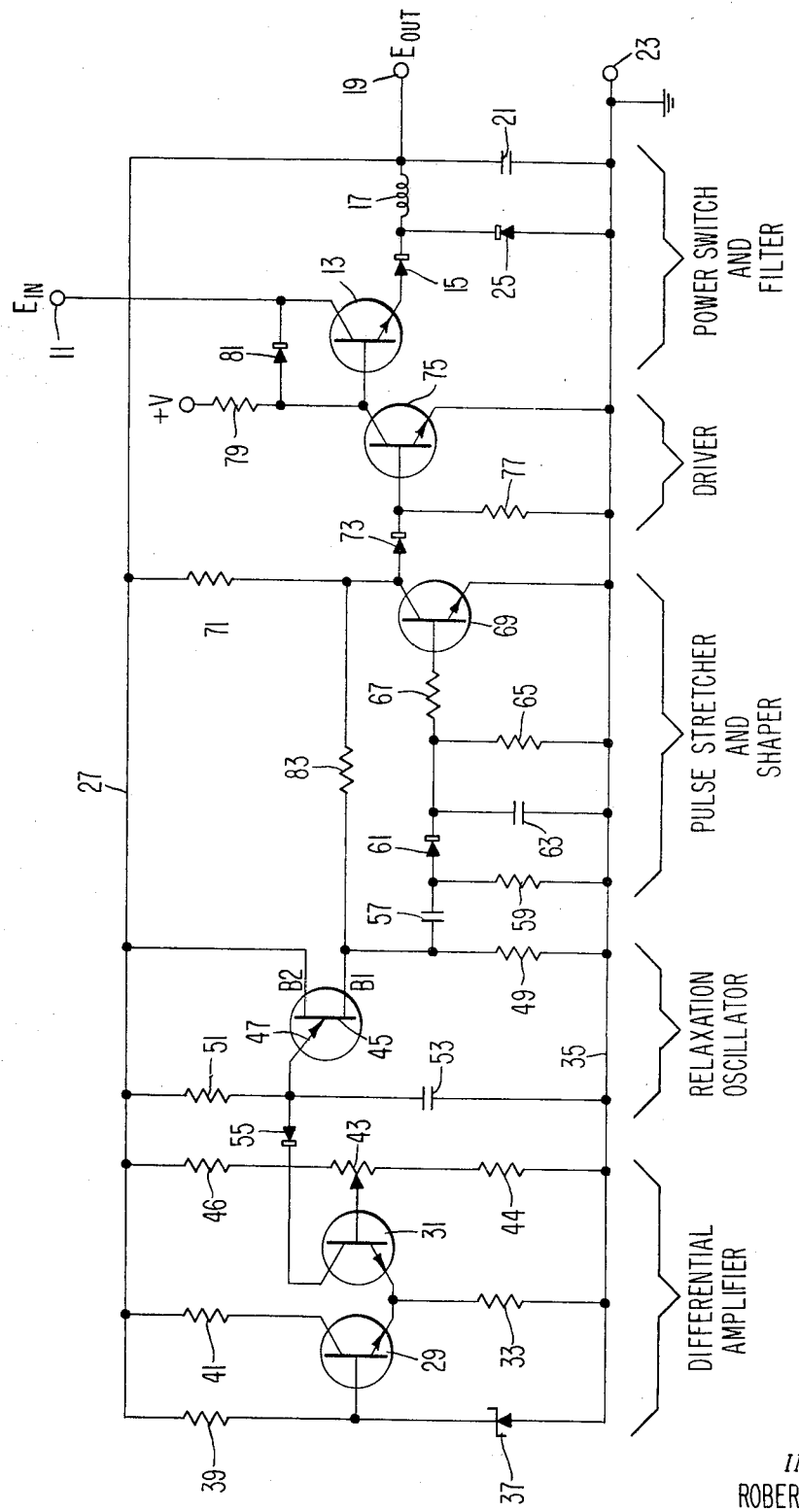
FIG. 1 is a schematic drawing illustrating the preferred embodiment of the voltage regulator of the present invention.

Referring now to FIG. 1, in detail, there is provided a power switching and filtering circuit having an input terminal 11 for receiving an unregulated D.C. voltage, $E_{in}$. This unregulated input voltage is periodically interrupted, or chopped, by an NPN power transistor switch 13 and applied through an isolating diode 15 to a filter inductance 17 and thence to an output terminal 19. In addition to the inductance 17, the filtering circuit includes a filter capacitor 21 connected between terminal 19 and a ground or common terminal 23. Also, a diode 25 is connected between the common terminal 23 and the junction of diode 15 and inductance 17. The diode 25 is poled to permit a "free-wheeling" current flow in the filter inductance 17 and capacitor 21 during the off-time of the transistor switch 13, thus preventing undesirable voltage spikes at the emitter of transistor 13 and at the output terminal 19. A load (not shown) can be connected across the terminals 19 and 23.

The voltage across the load terminals 19 and 23 is regulated to a predetermined value by controlling the on-off switching rate of the power transistor 13 by feedback and control circuitry, which functions to maintain the on-time of the transistor 13 constant during each switching cycle and to vary the off-time of the transistor 13 in accordance with the desired output voltage. Voltage regulation may be understood by assuming first that it is desired to regulate the load voltage to a predetermined level, $E_{out}$. When the voltage at the terminal 19 is substantially below this predetermined level, the power transistor 13 is switched at a relatively high rate so that there is little off-time between successive on-times. Thus the voltage at the output terminal 19 begins to rise. When the output voltage approaches the predetermined level, $E_{out}$, the power switching transistor 13 is switched at a lower rate so that it is non-conducting during most of each cycle. As a result, the output voltage begins to drop. Thus any tendency for the output voltage to increase is compensated for by increasing the off-time of switching transistor 13. Similarly, a tendency for the output voltage to decrease is compensated for by decreasing the transistor off-time. During stable operation, the expression for the output voltage $E_{out}$ is as follows:

$$E_{out} = E_{in} \frac{T_{on}}{T_{on} + T_{off}}$$

wherein $E_{in}$ is the unregulated D.C. input voltage, $T_{on}$ is the on-time and $T_{off}$ is the off-time of the power switching transistor 13 during each switching cycle. It can be seen from the above equation that since the transistor on-time, $T_{on}$, is held constant, any variation in the input voltage $E_{in}$ is counteracted with an appropriate change in the transistor off-time, $T_{off}$.

The switching rate of the power switching transistor 13 is controlled by feedback circuitry which receives both its inputs control signal and its energizing power through a common line 27 connected to the positive voltage terminal 19. The feedback circuitry includes means for comparing the voltage at terminal 19 with a predetermined reference voltage, and pulse generating means responsive to the comparing means output. Also provided is an intermediate driver stage for applying control pulses from the pulse generating means to the power switching transistor.

In the illustrated embodiment, the comparing means is a differential amplifier including two NPN transistors 29 and 31 having their emitters coupled together through a common resistance 33 to a ground or common line 35 which is connected to the negative terminal 23. The transistor 29 has its base connected to a source of reference voltage established at the junction of a Zener diode 37 and a resistor 39, which are connected in series between the lines 27 and 35. The collector of transistor 29 is connected through a current limiting resistor 41 to the positive voltage line 27. Transistor 31 has its base connected to the adjustable tap of a resistor 43, which is in a series connection with resistors 44 and 46. The three resistors 43, 44 and 46 form a voltage divider connected between the lines 27 and 35 for receiving the regulator output voltage across terminals 19 and 23. The collector of transistor 31 is connected to the pulse generating means, as will be hereinafter described.

The differential amplifier output from the collector of transistor 31 drives the pulse generating means which in turn controls the switching frequency of power transistor 13. In order to achieve accurate and reliable switching control, the pulse generation means is preferably unaffected by variations in temperature and component parameters within reasonable limits. In one type of prior art device, pulse generation has been achieved through the use of D.C. controlled asymmetrical multi-vibrators. Other prior art devices have employed more complex arrangements, such as the combination of a two-input bistable multi-vibrator and separate relaxation oscillators for driving the respective inputs to the multi-vibrator to control the switching frequency and on-off duty cycle. The voltage regulator of the present invention employs an improved pulse generating means which has all of the aforementioned advantages of accuracy, reliability and stability, but features a novel simplified circuit configuration utilizing fewer active components.

In the illustrated embodiment of applicant's invention, the pulse generating means includes a unijunction transistor relaxation oscillator of the well known type shown and described, for example, in the General Electric Controlled Rectifier Manual, first edition, pages 51–53. Briefly, the relaxation oscillator comprises a unijunction transistor 45 having a base-one electrode (B1), a base-two electrode (B2), and an emitter electrode 47. The base-one electrode is connected through a resistor 49 to the negative voltage line 35, and the base-two electrode is connected to the positive voltage line 27. The emitter electrode 47 is connected to the junction of a resistor 51 and a capacitor 53 in an RC charging circuit. The other end of resistor 51 and the other side of capacitor 53 are connected, respectively, to the positive voltage line 27 and the ground line 35. The junction of the resistor 51 and capacitor 53 is also coupled to the collector of transistor 31 through a diode 55, the function of which will be hereinafter described.

As is well known in the art, when the voltage at the emitter 47 of the unijunction transistor 45 is less than a predetermined peak-point voltage, the unijunction transistor has the characteristics of a high impedance device, and therefore substantially no current flows between its emitter and the base-one electrode. However, when the voltage at the emitter exceeds the peak-point voltage, the unijunction transistor becomes conducting and exhibits a low impedance characteristic between the emitter and the base-one electrode.

In operation of the unijunction transistor circuit as a relaxation oscillator, the capacitor 53 is charged at a rate dependent on the value of the resistor 51 and the effective resistance of the differential amplifier transistor 31, the latter resistance being determined by the difference between the Zener diode reference voltage and the regulator output voltage. When the charge on the capacitor 53 causes the emitter electrode 47 to reach the peak-point voltage, the unijunction transistor turns on and discharges the capacitor 53 through the resistor 49. The emitter electrode 47 then drops below the peak-point voltage and the unijunction transistor becomes non-conducting, thus enabling the charging cycle to begin again. The recurring discharge of capacitor 53 through the unijunction transistor 45 and the resistor 49 produces a series of pulses at the base-one electrode. These pulses are generated at a rate proportional to the magnitude of the difference between the regulator output voltage at terminal 19 and the reference voltage as determined by the Zener diode 37.

The pulses generated by the relaxation oscillator are in the nature of sharp voltage spikes. These spikes are applied to a pulse stretching and shaping circuit through a capacitor 57 having one terminal connected to the base-one electrode of the unijunction transistor 45. The other terminal of the capacitor 57 is connected to one end of a resistor 59, the other end of which is coupled to the ground or negative voltage line 35. The voltage spikes developed across the resistor 59 are applied through a diode 61 to the junction of a capacitor 63, a resistor 65, and a resistor 67. The capacitor 63 and the resistor 65 are connected in parallel to the line 35. Resistor 67 is coupled to the base of an NPN transistor 69, the emitter of which is connected to the negative line 35 and the collector of which is connected through a current limiting resistor 71 to the positive line 27.

Each voltage spike developed across resistor 59 charges the capacitor 63 to a predetermined voltage level. After a voltage spike has occurred, the capacitor 63 discharges through the resistors 65 and 67. The discharge through resistor 67 turns on transistor 69 for a length of time determined by the rate of decay of the voltage across capacitor 63. Thus the sharp spikes generated by the unijunction transistor 45 are stretched, or integrated, and shaped into square pulses of uniform duration. These pulses appear in inverted form at the collector of transistor 69.

The pulse signal at the collector of transistor 69 is applied through a diode 73 to the base of a signal inverting and driving transistor 75 of the NPN type. A biasing resistor 77 is connected between the negative line 35 and the base of transistor 75. This transistor also has an emitter electrode connected to the line 35, and a collector electrode connected through current limiting resistor 79 to a source of positive D.C. voltage, V+. The voltage V+ may be the input voltage $E_{in}$ from terminal 11, in which case the unconnected end of resistor 79 may be connected directly to the input line 11. However, for the values of the circuit components as hereinafter listed, the use of a higher voltage is preferable to reduce the current drawn by transistor 75 in turning off the switching transistor 13. The base of the switching transistor 13 is connected directly to the collector of transistor 75 for receiving the pulse switching signal. The base of power transistor 13 and the collector of transistor 75 are clamped to the voltage $E_{in}$ by a diode 81 in order to prevent damage to these two transistors when a voltage source higher than $E_{in}$ is connected to resistor 79.

Figure 2:
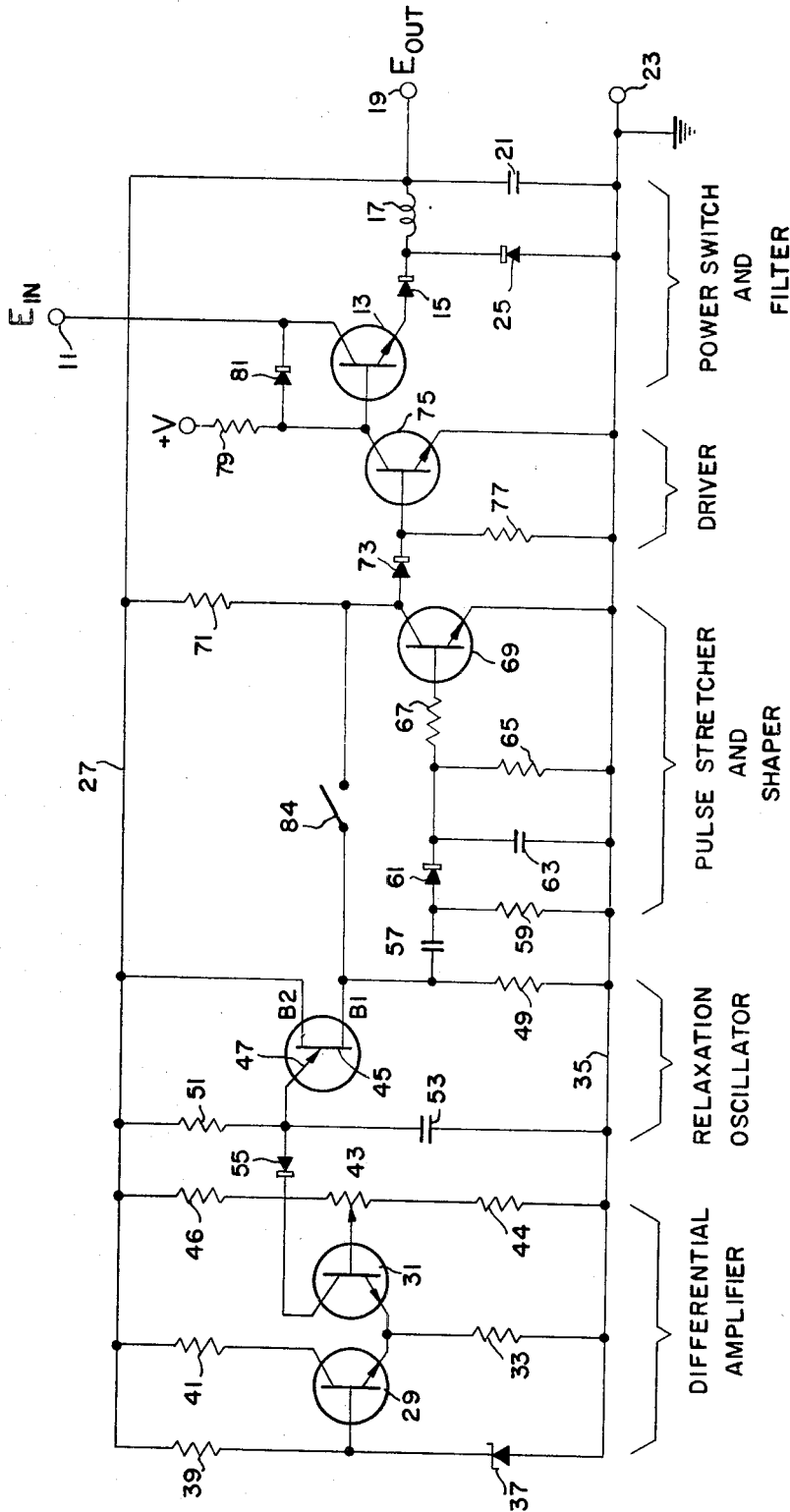
FIG. 2 is a schematic drawing illustrating an alternate embodiment of the voltage regulator of the present invention.

In order to reliably start cyclic operation of the voltage regulator every time an unregulated voltage is applied to the input terminal 11, the pulse signal at the collector of transistor 69 must be large enough to switch the driving transistor 75, and thus the power transistor 13, to fully off and fully on conditions. When the regulator is first turned on, the output voltage at terminal 19 and on the positive voltage line 27 will be low and as a result the relaxation oscillator energized thereby will produce low voltage spikes which will be dissipated in the pulse stretching and shaping network. Therefore proper switching will not be achieved and the transistors 69, 75 and 13 will stall at some intermediate state of conduction. To prevent this situation, there is provided a means for bypassing the pulse stretching and shaping network, so as to apply the oscillator output pulses from the base-one of the unijunction transistor 45 directly to the input of the driver stage. In the preferred embodiment of the present invention, the bypass means is a resistor 83 connected between the base-one of unijunction transistor 45 and the input to the driver transistor 75 at the collector of transistor 69; however in an alternative form of the invention, the resistor 83 may be substituted with a manually or automatically operated starting switch 84 as shown in FIG. 2. With the bypass resistor 83 connected in the circuit the low voltage spikes at the base input to the driving transistor 75 will be large enough to start switching this transistor, which in turn will switch the power transistor 13.

It is well known in the art that unijunction transistors differ greatly from one another in their structural and functional characteristics. These characteristics are especially sensitive to thermal variations, which may be caused by external changes in ambient temperature or by internal heating as the unijunction transistor warms up during operation. The undesirable effects of thermal instability and resulting frequency drift in the relaxation oscillator are eliminated in the present invention by employing means for isolating the input and output of the unijunction transistor 45 from other parts of the circuitry. Specifically, diode 55 is provided to isolate the input. This diode also enables unijunction transistor 45 to reach its fully conducting state without excessive current drain from transistor 31, thus preventing the latter transistor from overheating. Capacitor 57 is provided to isolate the output of the unijunction transistor relaxation oscillator by providing AC coupling to the input of the pulse stretching and shaping network. Diode 55 and capacitor 57 provide the additional advantage that the unijunction transistor may be replaced with another of similar characteristics without adverse effects on the circuit operation.

It has been found that satisfactory circuit operation may be achieved with the following component values:

| Transistors: | Resistors: |
|---|---|
| 13—2N3054 | 33—500 ohms |
| 29—2N2713 | 39—1000 ohms |
| 31—2N2713 | 41—500 ohms |
| Unijunction Transistor 45—2N1671A | 43—1000 ohms |
| | 44—500 ohms |
| Transistors: | 46—1500 ohms |
| 69—2N2713 | 49—100 ohms |
| 75—2N2713 | 51—4700 ohms |
| Diodes: | 59—150 ohms |
| 15—1N2069 | 65—5100 ohms |
| 25—1N2069 | 67—10,000 ohms |
| Zener diode 37—1N705A | 71—6800 ohms |
| Diodes: | 77—3300 ohms |
| 55—1N4009 | 79—4000 ohms |
| 61—1N4009 | 83—1000 ohms |
| 73—1N4009 | Capacitors: |
| 81—1N2069 | 53—0.1 mfd. |
| | 57—2.0 mfd. |
| | 63—0.047 mfd. |

The values of inductor 17 and capacitor 21 in the output filtering circuit are not critical, but should be large enough to maintain ripple free current at the output terminals for the lowest switching frequency encountered during operation of the voltage regulator.

Considering now the overall operation of the voltage regulator, assume initially that the power transistor 13 is in its off state and that terminal 11 is disconnected from the source of input voltage. When an unregulated D.C. voltage is applied at terminal 11, transistor 13 is turned on, and a voltage level substantially below the desired regulated output voltage, $E_{out}$, is developed across the capacitor 21 and thus the output terminals 19 and 23. This voltage level, is applied through the common lines 27 and 35, and is sufficient to turn on the unijunction transistor 45 and start operation of the relaxation oscillator to produce a series of low voltage spikes at the base-one (B1) of the unijunction transistor. At this time, the voltage across the common lines 27, 35 is too low to activate the differential amplifier and the pulse shaping transistor 69. Therefore the relaxation oscillator is essentially free running at some predetermined frequency, and the low voltage spikes produced thereby are dissipated in the pulse stretching and shaping network and do not switch the transistor 69. However, each spike is fed through bypass resistor 83, or alternatively through a starting switch, to forward bias the diode 73, and thus to turn on transistor 75 and turn off the power transistor 13. When transistor 13 is off, the capacitor 21 begins discharging, but its time constant in the filtering circuit is large enough that the voltage decrease across the common lines 27, 35 is inconsequential.

For a very short length of time, transistor 75, and thus transistor 13, are controlled by the voltage spikes received through the resistor 83. The voltage across capacitor 21 gradually increases to an intermediate value between the low starting voltage and the voltage $E_{out}$. At this intermediate voltage, each pulse appearing across the pulse stretching capacitor 63 becomes large enough to exceed the threshold voltage of transistor 69, thus turning it on. With the occurrence of each pulse, diode 73 is back biased, transistor 75 is turned off, and power transistor 13 is turned on. Therefore the unregulated input voltage continues to charge capacitor 21, and the output voltage continues to increase.

The gradually increasing output voltage is applied through the voltage divider comprising resistors 43, 44 and 46 to the base of transistor 31 to turn it on slightly, thus activating the differential amplifier. In operation of the differential amplifier, Zener diode 37 establishes a predetermined reference voltage on the base of transistor 29 to cause partial conduction thereof through resistor 33. Simultaneously, as just described, a predetermined portion of the regulator output voltage is applied through the voltage divider network comprising resistors 43, 44 and 46 to the base of transistor 31. A current path is established through resistor 51, diode 55, transistor 31 and resistor 33, with the degree of conduction of transistor 31 being dependent on its base—emitter forward bias, which is determined by the voltage across resistor 33 and by the base input voltage from the voltage divider network. Transistor 31 operates as a variable resistor, which in combination with the resistor 51, regulates the charging rate of capacitor 53. As the voltage across the output terminals 19 and 23 approaches $E_{out}$, transistor 31 gradually increases conduction and a longer time is required for capacitor 53 to charge and thus to raise the voltage on the emitter 47 to a level sufficient to fire the unijunction transistor 45. Therefore the output pulses from the relaxation oscillator occur less frequently, and for a given time period the overall on-time of power transistor 13 is decreased. The output voltage at terminal 19 is thereby prevented from increasing to the level of the unregulated voltage, but instead is maintained, or regulated, at the voltage level $E_{out}$.

If the voltage at terminals 19, 23 and thus on lines 27, 35 exceeds $E_{out}$ due to a malfunction of the regulator circuit or due to the occurrence of an over-voltage condition, such as a voltage surge at the output, transistor 31 is forced into hard conduction, so as to effectively shunt the capacitor 53 and reduce the voltage at the emitter 47 to a level below the firing point of the unijunction transistor 45. As a result, the relaxation oscillator ceases operation, transistor 69 is turned off, transistor 75 is turned on, and power switching transistor 13 is turned off, so that the regulator is shut down until the output voltage drops back to a level near $E_{out}$.

The present invention features a simplified circuit configuration which is highly reliable in operation. All transistors, except the unijunction transistor 45, are of the NPN type and the bias voltages therefore are all of one polarity. Furthermore, the feedback control circuitry is driven from the single input line 27, from which both the energizing power and the control signal is received. The voltage regulation achieved by this simplified circuitry has been found to be very accurate. For example, with the component values listed hereinabove and an unregulated D.C. input voltage at terminal 11 ranging from 40–60 volts, the output voltage across terminals 19 and 23 may be maintained at 17 volts with a load of 0 to 3 amperes. In the 0 to 1 ampere load range, the regulation is accurate within ±½% of the output voltage. When the unregulated voltage input is in the 40–60 volt range the D.C. voltage V+ applied to resistor 79 of the driver stage is preferably 100 volts; however, as previously stated, the resistor 79 may instead be connected to the input voltage line 11, in which case the clamping diode 81 may be eliminated.

While the voltage regulator has been shown and described in considerable detail and several variations in the system have been pointed out in the discussion herein, it will be understood that many other changes or variations may be made without departing from the scope and spirit of the invention, as defined in the following claims.

I claim:

1. In a voltage regulator having a power switching circuit connected between an unregulated D.C. voltage source and the load, an improved feedback circuit for controlling cyclic operation of said power switching circuit, said feedback circuit comprising:
   means for generating a reference voltage from the voltage across the load,
   means for comparing said reference voltage with the voltage across the load to produce a difference signal output,
   unijunction transistor relaxation oscillator means for generating output pulses at a frequency proportional to the magnitude of said difference signal, and
   pulse stretching and shaping means responsive to the output pulses of said oscillator means for applying control pulses of predetermined constant width to said power switching circuit,
   said comparing means, oscillator means, and pulse stretching and shaping means being connected in parallel across the load for energizing the feedback circuit solely by the voltage across the load.

2. The feedback circuit in the voltage regulator of claim 1, said comparing means including a differential amplifier having
   a variable impedance output responsive to the difference between the voltage across the load and said reference voltage,
   said oscillator means having a periodically chargeable capacitor for controlling the frequency of said output pulses, the charging rate of said capacitor being controlled by said variable impedance output of said differential amplifier, and
   said pulse stretching and shaping means including a passive RC network coupled to the output of said oscillator means, and
   an active element having a control electrode connected to said network and a main current carrying electrode connected to said network and a main current carrying electrode connected to said power switching circuit.

3. The feedback circuit of claim 2 including means for automatically turning off said power switching circuit during the occurrence of an unwanted voltage surge across said load, including a connection between said variable impedance output and said periodically chargeable capacitor.

4. The feedback circuit in the voltage regulator of claim 1, additionally including means for starting the cyclic operation of said power switching circut, said starting means being connected between said oscillator means and said power switching circuit for bypassing said pulse stretching and shaping means and coupling said oscillator output pulses directly to said power switching circuit when said unregulated D.C. voltage is first applied to the voltage regulator.

5. The feedback circuit in the voltage regulator of claim 1, additionally including first and second oscillator isolating means for maintaining drift-free and thermally stable oscillator operation, said first isolating means being connected between said oscillator and said difference signal output, and said second isolating means being connected between said oscillator output and said pulse stretching and shaping means.

6. A switching mode voltage regulator system comprising
   a power switching element for chopping an uregulated D.C. voltage,
   a network for filtering said chopped voltage,
   a load terminal connected to the output of said filtering network,
   a driving element for operating said power switching element, said driving element having a control input, and
   feedback means connected between said load terminal and said driving element control input for controlling the chopping frequency of said switching element in response to the voltage level at said load terminal, said feedback means including
      a predetermined reference voltage source,
      means for comparing said load terminal voltage with said reference voltage to produce a difference signal output,
      a unijunction transistor relaxation oscillator having an input network with a time constant which is variable in proportion to said difference signal, said oscillator being operable to generate output pulses at a rate dependent on said time constant,
      means for interconnecting said comparing means difference signal output and said oscillator input network,
      a passive network for stretching said oscillator output pulses to a constant width,
      means for coupling the output of said oscillator to said passive network, and
      an active element for shaping and inverting said constant width pulses, said shaping and inverting element having an output connected to said driving element control input.

7. The voltage regulating system of claim 6 wherein
   said means for interconnecting said comparing means difference signal output and said oscillator input network includes an asymmetrically conducting element for electrically disconnecting said oscillator from said comparing means during a portion of each cycle of oscillation, and
   said means for coupling said oscillator output to said passive pulse stretching network includes a capacitor.

8. The voltage regulating system of claim 6, further including bypass means connected between the output from said oscillator and the control input to said driving element for starting cyclic operation of said power switching element to effect voltage regulation when said unregulated D.C. voltage is first applied to said power switching element.

9. The voltage regulating system of claim 8, wherein said bypass means includes a switch.

10. The voltage regulating system of claim 8, wherein said bypass means includes a resistor.

11. The voltage regulating system of claim 6, said feedback means having a single input, said input being connected to said load terminal for detecting the voltage level at said terminal and for receiving energizing power.

12. The voltage regulating system of claim 6,
   said power switching element, said driving element, and said pulse shaping and inverting element each being a single NPN transistor, and
   said comparing means being a differential amplifier having only two NPN transistors.

References Cited
UNITED STATES PATENTS

| | | | |
|---|---|---|---|
| 3,114,025 | 12/1963 | Blauvelt et al. | |
| 3,193,696 | 7/1965 | Waldron | 323—18 X |
| 3,237,088 | 2/1966 | Karp et al. | 323—22 |
| 3,275,926 | 9/1966 | Sheheen | 323—22 X |
| 3,305,763 | 2/1967 | Kupferberg et al. | 323—22 X |

LEE T. HIX, Primary Examiner

A. D. PELLINEN, Assistant Examiner

U.S. Cl. X.R.
317—31; 323—38

PO-1050
(5/69)

UNITED STATES PATENT OFFICE
CERTIFICATE OF CORRECTION

Patent No. 3,510,756          Dated May 5, 1970

Inventor(s) Robert D. Chute

It is certified that error appears in the above-identified patent and that said Letters Patent are hereby corrected as shown below:

Column 1, line 39, "conductors" should be --conductance--;
Column 1, line 58, "way" should be --ways--; Column 1, line 65,
delete "time" (second occurrence); Column 3, line 10 "regular"
should be --regulator--; Column 8, lines 72 & 73, after "network"
delete --and a main current carrying electrode connected to said
network--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents